United States Patent [19]

Regehr

[11] 4,278,495

[45] Jul. 14, 1981

[54] SEPARATOR APPARATUS FOR EVAPORATOR PLANT

[76] Inventor: Ulrich Regehr, Susterfeldstrasse 63, D-5100 Aachen, Fed. Rep. of Germany

[21] Appl. No.: 88,562

[22] Filed: Oct. 26, 1979

Related U.S. Application Data

[63] Continuation-in-part of Ser. No. 911,873, Jun. 2, 1978, abandoned.

[30] Foreign Application Priority Data

Jun. 3, 1977 [DE] Fed. Rep. of Germany ....... 2725119

[51] Int. Cl.[3] ............................................. B01D 1/06
[52] U.S. Cl. ................................. 159/27 A; 202/197; 55/440; 55/421
[58] Field of Search ................. 202/197, 158; 203/40; 55/421, 440; 159/27 A

[56] References Cited

U.S. PATENT DOCUMENTS

| | | | |
|---|---|---|---|
| 2,103,521 | 12/1937 | Luly | 159/31 |
| 3,279,533 | 10/1966 | Kersteter et al. | 165/105 |
| 3,341,429 | 9/1967 | Fondrk | 203/95 |
| 3,751,886 | 8/1973 | Sokolowski | 55/318 |
| 3,938,972 | 2/1976 | Sugimura | 55/440 |
| 4,002,444 | 1/1977 | Artemov et al. | 55/413 |

*Primary Examiner*—Norman Yudkoff
*Attorney, Agent, or Firm*—Finnegan, Henderson, Farabow, & Garrett

[57] ABSTRACT

The invention relates to separator apparatus for an evaporator plant which is connectible to a heat exchanger and comprises a drop separator having an inlet at its upstream end receiving a liquid/vapor mixture from a heat exchanger, a liquid outlet, and a vapor outlet aperture downstream of the drop separator.

9 Claims, 12 Drawing Figures

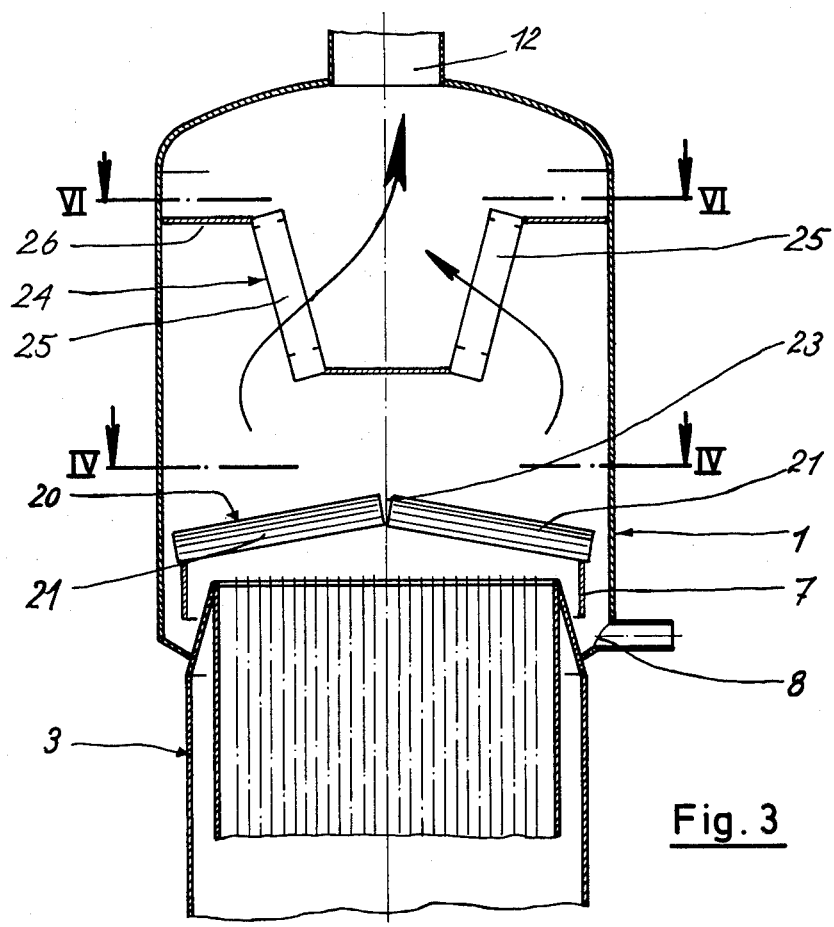
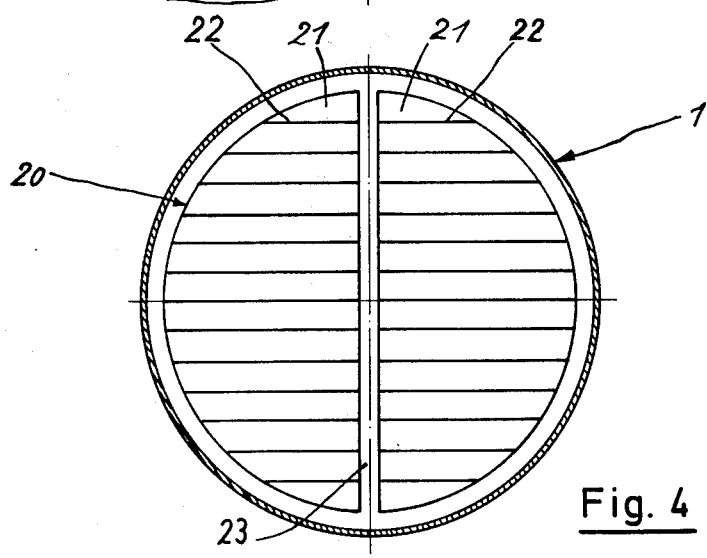

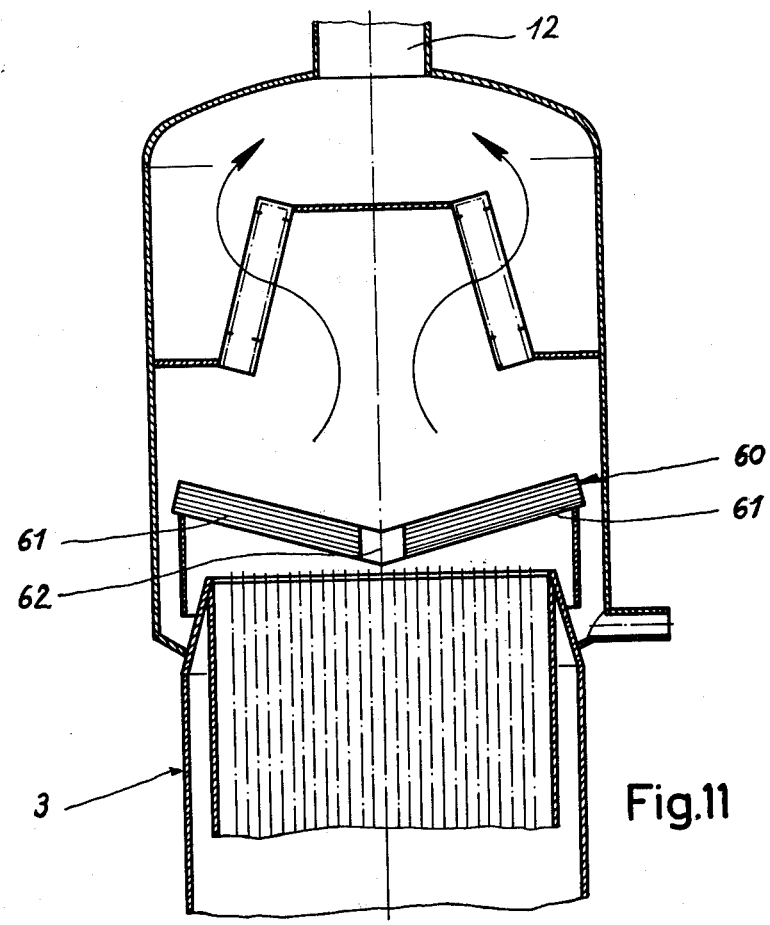
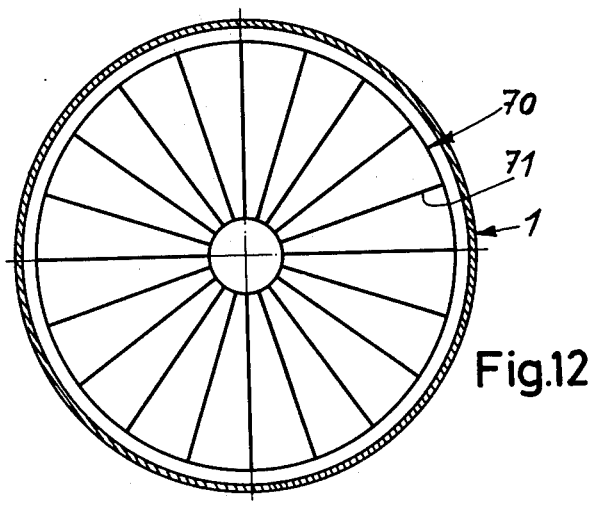

SEPARATOR APPARATUS FOR EVAPORATOR PLANT

This is a continuation-in-part of U.S. Pat. Ser. No. 911,873, filed June 2, 1978 now abandoned.

It is already known to use separator apparatus in conjunction with heat exchangers in evaporator plants to separate liquid that is carried along with generated vapor. Such separator apparatus are, for example, used to a considerable extent in the pulp industry so that when evaporating the liquid arising out of the production process, the liquid/vapor mixture is separated into a vapor phase on the one hand and a liquid phase on the other hand. For reasons of economy (recovery of chemicals) and environmental preservation, care must be taken that drops of liquid are not carried along by the vapor.

The known separator apparatus are generally arranged directly above a heat exchanger so that liquid/vapor mixture leaving the heat exchanger moves directly into an inlet aperture of the separator apparatus. Above this inlet aperture there is a baffle plate which the liquid/vapor mixture must circumnavigate. At a spacing above this baffle plate there is a drop separator which can be designed for a throughflow in a vertical or substantially horizontal direction. A vapor outlet aperture is positioned downstream of the drop separator.

In these known separator apparatus, the baffle plate is swept by the liquid/vapor mixture at a high speed and it deflects this mixture. This results in a first separation of the vapor and liquid phases. Whereas the separated part of the liquid phase drips back downwardly, the remainder of the mixture flows around the radially outwardly disposed edge of the baffle plate. This baffle plate arrangement requires that the separator have a large diameter. Also, with this flow around the baffle plate, there is an unfavorable flow pattern of the liquid/vapor mixture to the drop separator which is downstream of the baffle plate. This unfavorable flow pattern can be corrected by the time the liquid/vapor mixture enters the drop separator only if there is considerable spacing between the baffle plate and the drop separator. This spacing also necessarily increases the structural bulk of the apparatus. If there is an inadequate spacing between the baffle plate and the drop separator, excessive speeds of the mixture occur in parts of the drop separator resulting in droplets being carried along with the mixture.

The prior art therefore suffers from the disadvantage that the separator apparatus have hitherto been considerably bulky because of the required dimensions in both the horizontal and vertical directions.

The present invention resides in avoiding the disadvantages of the hitherto known separator apparatus, and in particular reducing the structural volume of these apparatus.

The problem is solved in a separator apparatus of the aforementioned kind in that a liquid-separating fin deflector having a substantially vertical throughflow direction is provided between the inlet aperture for the liquid/vapor mixture and the drop separator.

In this way the installation of a baffle plate is avoided. As a result the diameter of the separator apparatus in the vicinity of this fin deflector can be much smaller than when using a baffle plate. Further, downstream of the fin deflector there is a by far more uniform flow pattern of the liquid/vapor mixture than there is downstream of the hitherto known baffle plate. Since there is no need to correct the flow pattern of the mixture after it leaves the fin deflector, the drop separator can thus be arranged a relatively short distance from the fin deflector, thereby producing a considerable saving in the structural volume in the vertical direction.

By reason of the very uniform flow pattern downstream of the fin deflector, one can work with a higher mean throughflow speed in the drop separator and thereby increase the overall output of the separator apparatus. In addition, the separator apparatus proposed by the invention gives rise to lower pressure losses then with hitherto known apparatus of the kind in question. This reduction in pressure losses brings about an increase in the thermal efficiency of the plant because, by reason of the relatively low pressure drop, only a correspondingly small part of liquid is evaporated.

The invention also provides for the fin deflector to comprise at least two sections each having a plurality of shaped fins. This construction has considerable advantages particularly with regard to manufacture and assembly.

Further, the invention provides for the fin deflector to comprise two sections each of substantially semi-circular shape and having a diameter substantially equal to the outlet diameter of an upstream heat exchanger. In this way one obtains substantially constant flow sections and thus good flow conditions which are particularly advantageous with regard to low pressure losses.

According to the invention, the shaped fins may be directed substantially radially in their longitudinal direction. The shaped fins according to the invention may be longitudinally inclined to the horizontal.

It is a further suggestion of the invention that the sections of the fin deflector be inclined to each other in roof formation. Above all, this achieves more rapid flowing off of the separated liquid, thereby avoiding encrustation of the fin shapes.

It is another suggestion of the invention that the shaped fins be substantially sinusoidal and have in their longitudinal direction channels which extend transversely to the throughflow direction for leading liquid away. This construction likewise contributes to more rapid leading off of the separated liquid and ensures that the amount of liquid which circulates within the separator apparatus, drops back into the liquid/vapor mixture after separation and is again carried along by it into the separator can be kept very small. This considerably improves the separating efficiency of the drop separator.

Further, the invention provides that the throughflow area of the fin deflector be smaller than its leading impinged area. By increasing the throughflow speed, this leads to pulling of the liquid into the fin deflector acting as a separator and therefore ensures full effectiveness of the deflector. The increased throughflow speed also enables even the smallest droplets to be reliably separated.

The invention also suggests that the fin deflector be in the form of a twist producer. This brings about particularly rapid withdrawal of the separated liquid towards the wall. In conjunction with a fin deflector in the form of a twist producer, a downstream drop separator with substantially horizontal throughflow is used but this is not essential.

Other features of the invention and the subject of subsidiary claims will become evident from the following description of the invention given by way of example with reference to the drawings, wherein:

FIG. 3 shows a second embodiment of the separator apparatus according to the invention, wherein the fin deflector comprises two semi-circular sections inclined to each other in roof formation;

FIG. 4 is a section on the line IV—IV in FIG. 3;

FIG. 11 shows a further embodiment of the separator apparatus according to the invention in which the fin deflector consists of two sections inclined to each other in V formation and FIG. 12 is a plan view of a further embodiment of the separator apparatus according to the invention wherein the shaped fins are directed substantially radially.

Figure 1:
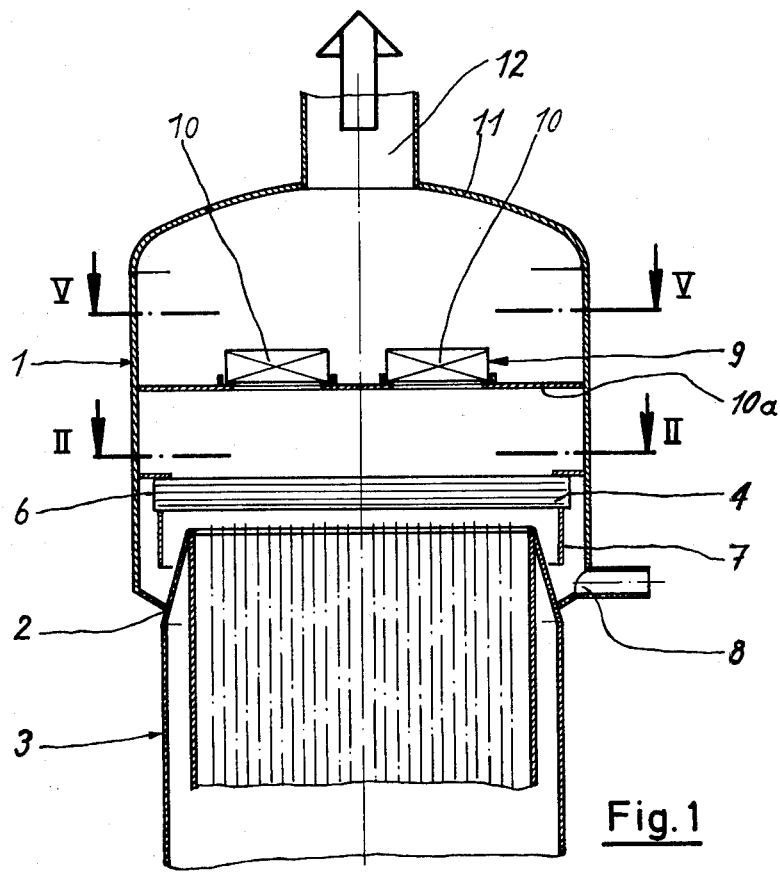
FIG. 1 shows the embodiment of the separator apparatus according to the invention with a vertically transversed drop separator in conjunction with a heat exchanger.

In the embodiment according to FIG. 1, the upper end of the heat exchanger 3 engages in the inlet aperture 2 of the separator apparatus and is sealed thereto.

Directly above the upper end of the heat exchanger 3, the separator apparatus has a fin deflector 4 which is constructed of shaped fins 5 and disposed in a horizontal plane. The fin deflector 4 is fixed to the peripheral wall of the housing 1 and is substantially circular, its diameter being only slightly less than the internal diameter of the housing 1 of the separator apparatus. The diameter of the fin deflector 4 is larger than the outlet cross-section of the heat exchanger 3. Near the radially outward edge 6 of the fin deflector 4, its underside is provided with a downwardly directed guide ring 7 which ensures that the mixture leaving the heat exchanger 3 cannot bypass the fin deflector 4 in the upward direction.

Figure 5:
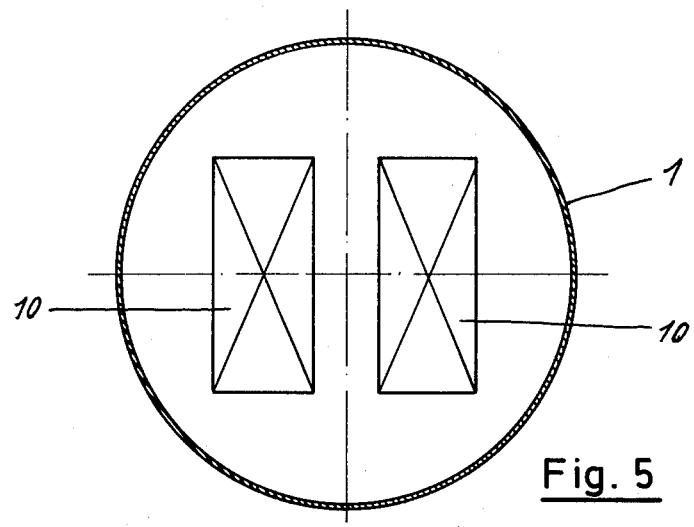
FIG. 5 shows the arrangement of the drop separator in a section of the line V—V in FIG. 1.

Beneath the fin deflector 4, the housing 1 of the separator apparatus is provided with an outlet aperture 8 for separated liquid. Above the fin deflector 4 there is a drop separator 9 comprising two parts 10 (FIG. 5). The parts 10 of the drop separator 9 are fixed to the housing 1 by a base 10a. The housing 1 of the separator apparatus has an upper cover section 11 with a vapor outlet aperture 12.

Figure 2:
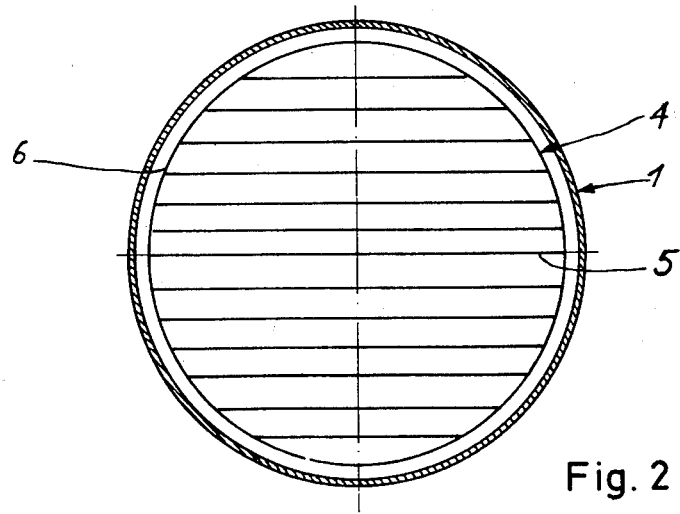
FIG. 2 is a section on the line II—II in FIG. 1.
Figure 6:
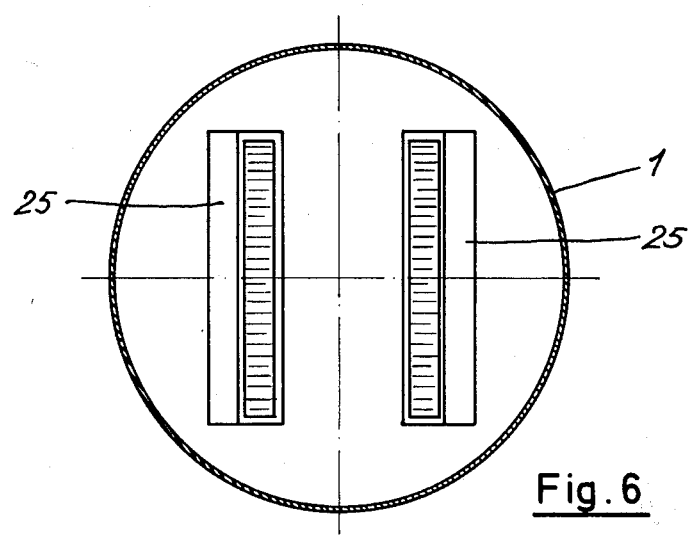
FIG. 6 shows the arrangement of a drop separator on the line VI—VI in FIG. 3.

Reference is now made to the embodiment described in FIGS. 3, 4 and 6. In this case the housing 1 is likewise placed on a heat exchanger 3. The construction of this housing 1 is substantially the same as that of the housing according to FIGS. 1, 2 and 5 but differs therefrom by being larger in the axial or vertical direction.

In this embodiment, provision is made above the upper end of the heat exchanger 3 of a fin deflector 20 comprising two semi-circular sections 21 assembled from shaped fins 22 in a complementary manner. The two sections 21 are inclined to each other in roof formation so that they have their highest point at their parting line 23 and drop off to both sides in a direction normal to this parting line 23. The fin deflector 20 is likewise provided with a guide ring 7 at its underside.

At a spacing above the fin deflector 20 there is a drop separator 24 comprising at least two sections 25 (FIG. 6). These known sections 25 are carried by intermediate bases 26. They are inclined only slightly to the vertical so that their throughflow direction is substantially horizontal. The vapor outlet aperture 12 is provided downstream of the drop separator 24.

Figure 7:
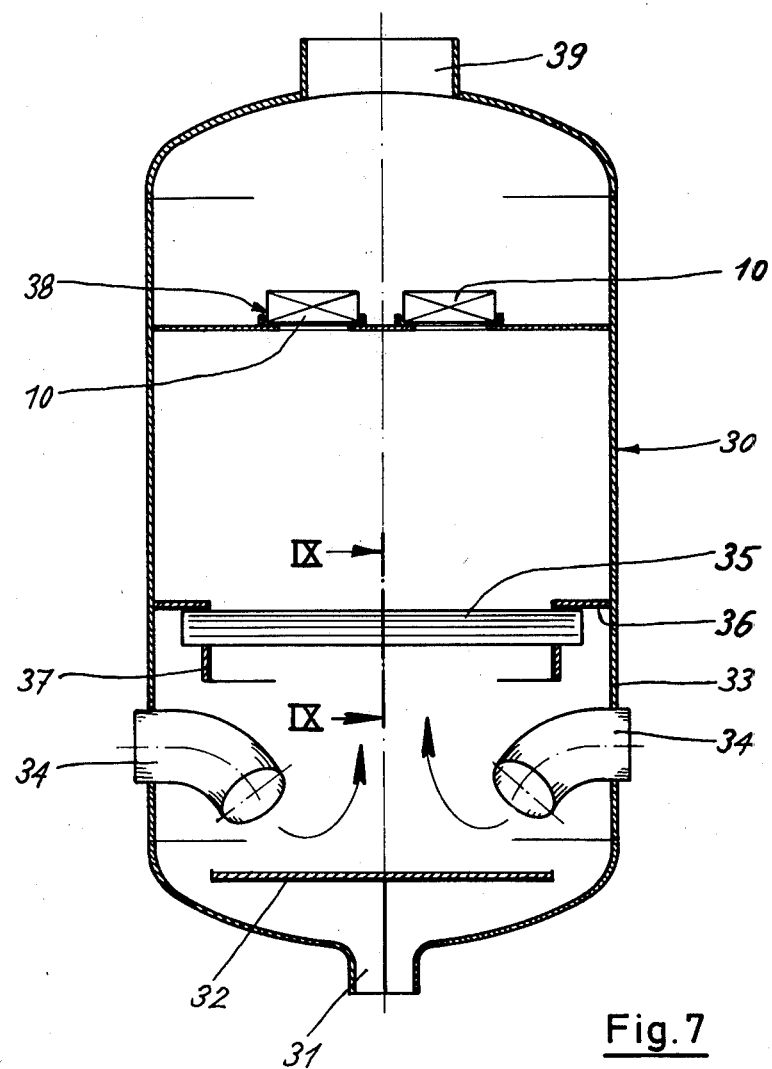
FIG. 7 illustrates a further embodiment of the separator apparatus according to the invention which is not arranged directly above a heat exchanger.

The embodiment of the separator apparatus illustrated in FIG. 7 comprises a cylindrical housing 30 having an outlet aperture 31 for separated liquid in its base. At a spacing above this outlet aperture there is a screening plate 32 which is circular and the edge of which terminates at a spacing from the inner wall of the housing 30.

The housing 30 has a cylindrical peripheral wall 33 through which two or more diametrically opposed inlet pipes 34 for liquid/vapour mixture are led. The ends of the inlet pipes 34 disposed within the housing 30 may be directed tangentially and/or downwardly towards the screening plate 32.

A fin deflector 35 held by an intermediate base 36 is provided in the housing 30 at a spacing above the screening plate 32.

A drop separator 38 corresponding to that already described with reference to FIGS. 1 and 5 or to that of FIGS. 3 or 6 is disposed at a spacing above the fin deflector 35. The housing 30 has a vapor outlet aperture 39 in its covering wall.

The separator apparatus of FIG. 11 substantially corresponds to that of FIGS. 3, 4, and 6. The only difference is that a fin deflector 60 is provided which comprises two semicircular sections 61 assembled from shaped fins in a complementary manner. The two sections 61 of the fin deflector 60 are inclined to each other in V formation so that they have their lowest point in the region of their parting line 62 and drop away towards the parting line 62 in a direction normal thereto. This ensures that the flow leaving the fin deflector and still containing a few droplets will not strike the inner wall of the housing but is led towards the central axis of the housing and will flow through the adjoining drop separator from the inside towards the outside.

FIG. 12 shows a fin deflector 70 of which the fins 71 extend substantially radially in their longitudinal direction, the fins preferably being inclined radially inwardly or radially outwardly.

Figure 8:
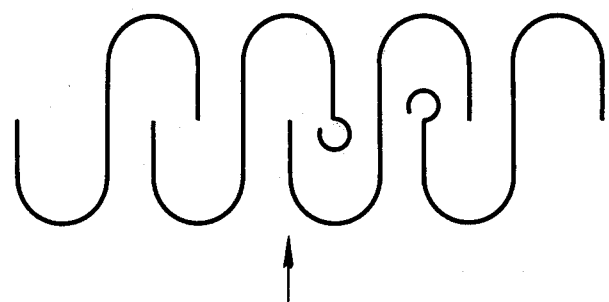
FIG. 8 is a section through a fin deflector on the line VIII—VIII in FIG. 7.

The fin deflector of FIG. 8 comprises a number of return bent sections 50 arranged parallel to each other. Each section 50 comprises two U-shaped portions 52, 54 connected by a common leg 56. Assuming the direction of liquid/vapor flow to be as shown by the arrow 58, inlet openings to the fin deflector are shown at 60 between adjacent U-shaped portions 52, 52, whereas outlet openings 62 are formed between adjacent U-shaped portions 54. U-shaped portion 54 of each section 50 is open to the downstream direction of liquid/vapor flow whereas U-shaped portion 52 of each section 50 is laterally offset and open to the upstream direction. The parallel sections 50 are interengaged in such a way that a free leg 64 of the U-shaped portion 52 reaches into the U-shaped portions 54 of the adjacent fin section 50.

Thus, the liquid/vapor mixture led into the fin deflector in the direction of the arrow 58 at first flows in a vertical direction. The mixture enters inlets 60 and flows into U-shaped portions 54 where the upward flow direction is changed to a downward direction. In the U-shaped portions 52 the direction of flow of the mixture is changed to an upward direction and it exits the fin deflector through outlets 62. Thus the liquid/vapor flow enters the fin deflector in a vertical direction and also leaves it in this direction. Between the inlets and outlets the flow is reversed twice.

Liquid drops contained in the liquid/vapor mixture impinge on the faces of the sections and are carried off within the bottom of the portions 52, which may be inclined according to the intended direction of liquid flow.

Figure 9:
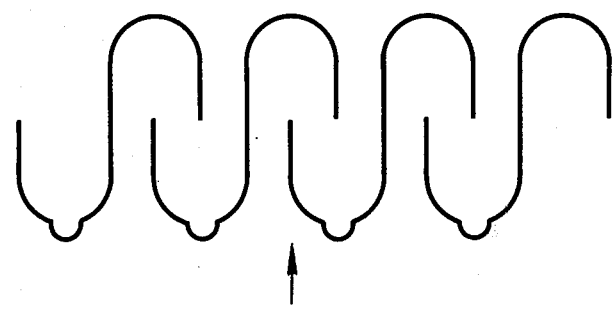
FIG. 9 is a section through a second embodiment of a fin deflector in which the fins have a partly modified shape.

The embodiment of FIG. 9 substantially corresponds to that of FIG. 8. The only difference is that in the area of the U-shaped portions 52, additional channels 66 are provided for collecting separated liquid and leading it away.

Figure 10:
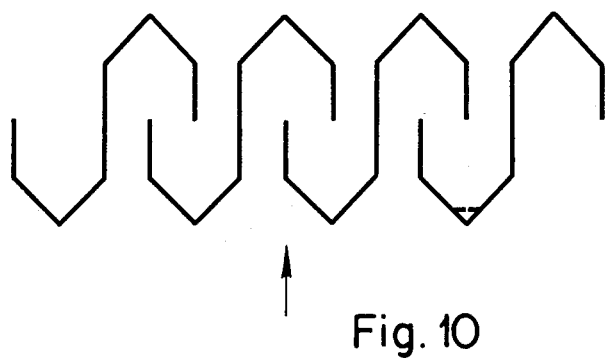
FIG. 10 is a section through a third embodiment of a fin deflector in which the fins have a cornered shape.

The embodiment of FIG. 10 deviates from the embodiments of FIGS. 8 and 9 in that each section 68 comprises a number of planar portions 70, 72, 74, 76, 78, 80, 82 which to some extent approach the rounded U-shaped portions of FIGS. 8 and 9. Also, the sections 68 of FIG. 10 can be provided with channels in the bottom of the upstream portion as in FIG. 7 to improve the drainage of the separated liquid.

A fin deflector according to the embodiments shown in FIGS. 8-10 can be used in any of the devices discussed in FIGS. 1, 7, 11 and 12. Thus, according to the device of FIG. 4, the fin deflector may comprise two semi-circular sections assembled from fins shaped according to FIGS. 8, 9 or 10 in a complementary manner. The two sections may be inclined to each other in a roof-like formation so that they have their highest point at their parting line and drop off to both sides of a direction normal to this parting line.

Also, the fin deflector of FIGS. 8, 9 or 10 may comprise two semi-circular sections inclined to each other in V formation so that they have their lowest point in the region of their parting line and drop away towards the parting line in a direction normal thereto as shown in FIG. 11.

The fin deflectors of FIGS. 8, 9 and 10 require double reversal of the flow direction of the liquid/vapor mixture and this causes the flow pattern on the downstream side of the fin deflector to be very uniform. This leads to the advantage that a second or drop separator can be arranged a short distance downstream of the fin deflector. This advantage is of considerable importance because the flow pattern on the upstream side of the fin deflector is very far from being uniform.

In the fin deflectors of FIGS. 8, 9 and 10, the liquid drops contained in the liquid/vapor mixture in most cases impinge on the faces of portions 52, 54 which are slightly inclined with respect to the direction of flow, the drops will not break up into smaller drops which are more difficult to separate from the mixture. This provides for more thorough liquid separation. Moreover, since the throughflow area of the fin deflectors of FIGS. 8, 9 and 10 is smaller than the leading impinged area, the liquid/vapor mixture moves through these fin deflectors at a relatively high speed. Therefore, even smaller liquid drops are separated by adherence to the surfaces of the fin deflectors.

The free end of leg 64 is provided with a bent portion forming a channel 84 being downwardly open.

On the other side the free end 86 of portion 54 is similarly provided with a bent portion forming a channel 82 being upwardly open to collect liquid and to lead it away.

What is claimed is:

1. A separator apparatus for an evaporator plant, said apparatus including a housing having an inlet opening connected to heat exchanger means to receive a liquid/vapor mixture therefrom, drop separator means in said housing downstream of said inlet opening, liquid outlet means in said housing upstream of said drop separator means, vapor outlet means in said housing downstream of said drop separator means, liquid-separating means in said housing between said liquid/vapor inlet means and said drop separator means, said liquid-separating means having a substantially vertical throughflow direction, said liquid-separating means comprising fin deflector means including a plurality of fins disposed in the path of the flowing liquid/vapor mixture, said fins including a plurality of double reverse bent sections arranged parallel to one another, each set of adjacent sections defining a substantially vertical inlet and outlet and a pair of substantially reverse flow portions between said inlet and said outlet.

2. Separator apparatus as defined in claim 1, said reverse bent sections having additional channels formed therein for collecting liquid in the bottom of said sections to lead said liquid away.

3. Separator apparatus as defined in claim 1, said fin deflector outlets being offset laterally from said fin deflector inlets.

4. Separator apparatus as defined in claim 1, the contour of each reverse bent channel section being generally U-shaped.

5. Separator apparatus as defined in claim 1, the throughflow area of said fin deflectors being smaller than the leading area thereof.

6. Separator apparatus as defined in claim 1, said liquid-separating means including at least two sections each having a plurality of fins.

7. Separator apparatus as defined in claim 6, said heat exchanger means having an outlet opening communicated with said housing inlet opening, said sections each being substantially semi-circular in shape and together having a diameter substantially equal to the diameter of the outlet opening of said heat exchanger means.

8. Separator apparatus as defined in claim 6, said liquid-separating sections being inclined to each other and to the vertical throughflow direction of said liquid-separating means.

9. Separator apparatus as defined in claim 8, said liquid-separating sections being inclined to each other in a V formation.

* * * * *